United States Patent
Shi et al.

(10) Patent No.: US 11,710,070 B2
(45) Date of Patent: Jul. 25, 2023

(54) MACHINE LEARNED MODEL FRAMEWORK FOR SCREENING QUESTION GENERATION

(71) Applicant: Microsoft Technology Licensing, LLC, Redmond, WA (US)

(72) Inventors: Baoxu Shi, Sunnyvale, CA (US); Shan Li, Santa Clara, CA (US); Jaewon Yang, Sunnyvale, CA (US); Mustafa Emre Kazdagli, Palo Alto, CA (US); Feng Guo, Los Gatos, CA (US); Fei Chen, Saratoga, CA (US); Qi He, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 561 days.

(21) Appl. No.: 16/853,442

(22) Filed: Apr. 20, 2020

(65) Prior Publication Data
US 2021/0326747 A1   Oct. 21, 2021

(51) Int. Cl.
| | |
|---|---|
| G06N 20/00 | (2019.01) |
| G06N 3/00 | (2023.01) |
| G06N 5/00 | (2023.01) |
| G06Q 10/00 | (2023.01) |
| G06Q 10/1053 | (2023.01) |
| G06N 5/04 | (2023.01) |
| G06N 3/08 | (2023.01) |

(52) U.S. Cl.
CPC .............. *G06N 20/00* (2019.01); *G06N 3/08* (2013.01); *G06N 5/04* (2013.01); *G06Q 10/1053* (2013.01)

(58) Field of Classification Search
CPC .............................. G06Q 10/00; G06Q 50/00
USPC ........................................................ 705/7.25
See application file for complete search history.

(56) References Cited

U.S. PATENT DOCUMENTS

| | | | |
|---|---|---|---|
| 2015/0242816 A1* | 8/2015 | Srimushnam | G06Q 10/107 705/321 |
| 2017/0242917 A1* | 8/2017 | Kenthapadi | G06F 16/9024 |
| 2017/0316361 A1* | 11/2017 | Jagota | G06Q 10/06313 |
| 2019/0197482 A1* | 6/2019 | George | G06F 40/30 |
| 2019/0377797 A1* | 12/2019 | Liu | G06N 3/08 |
| 2021/0182798 A1* | 6/2021 | Bikumala | G06F 16/951 |
| 2021/0232948 A1* | 7/2021 | Otsuka | G06N 3/0454 |
| 2021/0406758 A1* | 12/2021 | Ho | G06F 17/18 |

* cited by examiner

*Primary Examiner* — Mustafa Iqbal
(74) *Attorney, Agent, or Firm* — Schwegman, Lundberg & Woessner, P.A.

(57) ABSTRACT

In an example embodiment, a screening question-based online screening mechanism is provided to assess job applicants automatically. More specifically, job-specific questions are automatically generated and asked to applicants to assess the applicants using the answers they provide. Answers to these questions are more recent than facts contained in a user profile and thus are more reliable measures of an appropriateness of an applicant's skills for a particular job.

20 Claims, 7 Drawing Sheets

MACHINE LEARNED MODEL FRAMEWORK FOR SCREENING QUESTION GENERATION

TECHNICAL FIELD

The present disclosure generally relates to technical problems encountered in performing machine learning modeling for screening question generation. More specifically, the present disclosure relates to the use of a specific framework for machine learning to generate screening questions.

BACKGROUND

The rise of the Internet has occasioned two disparate yet related phenomena: the increase in the presence of social networking services, with their corresponding user profiles visible to large numbers of people, and the increase in the use of these social networking services to provide content. An example of such content is a job listing. Users of the social networking services can search for or be presented with job listings and the users can then apply for the corresponding jobs directly from the social networking service itself.

In hiring, interviewing applicants is costly and inefficient. For this reason, recruiters typically screen the applications in an applicant pool by their profile and then conduct additional phone screenings before sending out interview invitations. This itself, however, can be inefficient and as such the majority of applications for coveted jobs are not properly screened in the hiring funnel because recruiters do not have time to review them all.

Machine learned models have been used to attempt to address these inefficiencies. Existing machine learned models aim to match job listings to candidates and applicants based on past interactions with a graphical user interface in which the job listings are displayed or based on user profile attributes. These models, however, rely on the assumption that applicants' online profiles and resumes are always up-to-date and contain all the information that hiring companies need. The user profile is not a perfect source for modeling applicants because users do not update their profiles promptly and there is often a gap between what users present in their profile and what employers want to know. Additionally, text within a job listing is sub-optimal for modeling job qualifications due to the fact that the text may appear to require certain attributes that are trivial or unnecessary for the job.

As such, existing machine learned models suffer from the technical problems of providing less than reliable recommendations and not improving the inefficiencies in the hiring process.

What is needed are improvements to computer-based machine learned modeling that act to remedy the technical issues with prior computer-based machine learned modeling.

BRIEF DESCRIPTION OF THE DRAWINGS

Some embodiments of the technology are illustrated, by way of example and not limitation, in the figures of the accompanying drawings.

DETAILED DESCRIPTION

Overview

Figure 1:
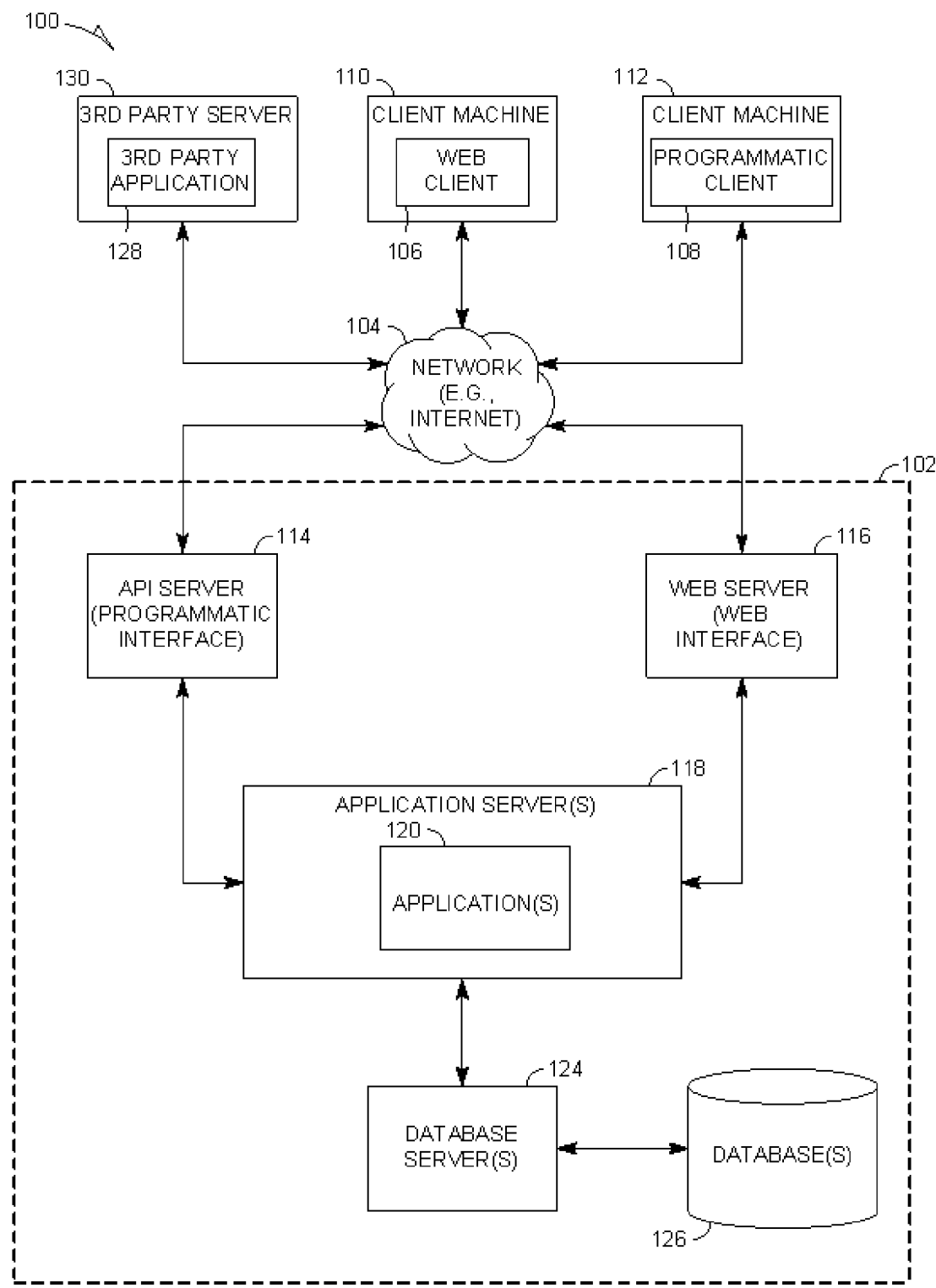
FIG. 1 is a block diagram illustrating a client-server system, in accordance with an example embodiment.

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, a screening question-based online screening mechanism is provided to assess job applicants automatically. More specifically, job-specific questions are automatically generated and asked to applicants to assess the applicants using the answers they provide. Answers to these questions are more recent than facts contained in a user profile and thus are more reliable measures of an appropriateness of an applicant's skills for a particular job.

There are two specific challenges in designing such a mechanism. First, the mechanism should provide an easy way to add screening questions for particular jobs. Second, the mechanism should help recruiters identify qualified applicants quickly. This latter challenge is made even more difficult by virtue of the fact that unstructured text questions cannot be used as one job requirement may use different expressions than other to describe the same requirement, and thus it is difficult for machine learned models to interpret the intent of a screening question, group screening questions with the same intent together, and categorize applicants based on their answers to screening questions. For example, a job listing for a hotel manager may indicate that 10 years experience in the hotel/food service industry, whereas another job listing for a hotel manager may indicate that 10 years experience in the hospitality industry is necessary, and both listing may (or may not) have meant the same thing. It could get even further confusing as a job listing for a hospital worker may require 4 years experience working for a hospital but may incorrectly word that as "4 years experience working for a hospitality". Existing machine learned models are not reliable in resolving these issues.

An unstructured text question is one in which none of the words/terms in the question are categorized in a way that would make a machine learned model more able to deduce its meaning. For example, the term "Java", if in an unstructured question, provides no information as to whether the author meant the job skill (programming language) of Java, is referring to the geographical location "Java", or is part of the name of a coffee shop (e.g., "Java Portland").

In an example embodiment, a screening question generation (SQG) model is utilized that automatically generates structured screen questions for a given job listing. This machine learned model generates structured screening questions in the format of (template, parameter). Screening questions will have a unified internal representation that describes the intent of the question (template) and the focus (parameter) of the question. Using structured representation instead of unstructured text avoids screening question ambiguity and discrepancy across different jobs. It also makes it easier for the recruiter, who will eventually review the answers to the questions, to group and screen candidates based on specific intent, such as education, language, and others.

DESCRIPTION

While the proposed methodology may be utilized for a number of different types of pieces of content and user interface action types, in an example embodiment, it is applied specifically to the case of user interface "clicks" and "applies" on job listings. For ease of discussion, an embodiment focusing on a job listing as the piece of content will be described throughout this document, but the claims shall not be interpreted as limiting the scope of protection to job listing content unless explicitly recited.

Prior art techniques for applying machine learning to question generation suffer from many technical drawbacks when applied to job listings. Specifically, unlike typical question generation datasets that are often shorter passages focusing on a few specific topics, the input of screen question generation are lengthy text from job listings having both different narrative styles across different industries and also various topics ranging from company introduction, requirements, benefits, and so forth. Thus, it would be beneficial to have a screening question generation model that is able to process long text strings and general enough to handle job listings from various industries.

Additionally, most prior art question generation machine learned models are used in the academic field and are thus designed to generate questions to test the cognitive skills of readers. For screening questions, however, it is important for the questions to request job qualifications, not just general cognitive ability. For example, a prior art question generation model may, given the text of a typical staff software engineer job listing, return "what is to enable others to derive near-limitless insights from social networking service data?" or "what does experience stand for?," neither of which are good screening questions for a job.

Lastly, prior art techniques for applying machine learning to question generation are designed without explicit latency constraints. This means that the techniques need not perform quickly. In contrast, a screening question generation model needs to have strict latency requirements because recruiters expect the model to provide screening questions right after the job description has been entered. To avoid sluggish performance, the SQG model needs to have a simple yet effective architecture in order to keep the inference latency within an acceptable range.

In light of all the above challenges, in an example embodiment, a two-step SQG model is utilized that, given the content of a job listing, first generates all possible structured screening questions using a deep learning model and then ranks and identifies top-k screening questions as the model output.

To generate the possible screening questions, job postings are divided into sentences and the questions are generated by converting each screening question-eligible sentence to a potentially different structured pair of (template, parameter). To obtain the template of the sentence, multiclass classification is performed in which one sentence is classified into one of a plurality of predefined templates. The challenge is develop a deep, fast model that can understand the semantic meaning of the job listing text with a small number of labeled examples used as training data.

In an example embodiment, deep transfer learning with a deep averaging network is utilized to achieve both speed and accuracy. In terms of parameter entities, an entity linking system is utilized to tag mentions in the sentence and link them to the corresponding entities. For question ranking, an XGBoost pairwise ranking model is used to sort screening questions using job and question features.

As described briefly above, the screening questions in the SQG model are structured instead of freeform text. Specifically, they have the structure (template, parameter). For example, one pair may be (How many years of work experience do you have using, Java), with the first part being the template and the second part being the parameter. This provides several technical benefits.

First, by predefining the question types and possible parameters, it can be ensured that the screening question is unambiguous and reduces the chance of introducing inappropriate questions.

Second, unlike freeform text, the intent of the structured questions are strictly defined by the question template. Therefore, job posters can easily group and screen job candidates based on certain intent (e.g., education, background, experience in multiple industries, list of tools they are familiar with, etc.).

Third, by limiting screening questions to having predefined templates and parameters, questions from different job postings can have exactly the same representation. This property make it possible to recommend jobs that the applicants may be qualified for by comparing their answers to other jobs' screening questions.

FIG. 1 is a block diagram illustrating a client-server system 100, in accordance with an example embodiment. A networked system 102 provides server-side functionality via a network 104 (e.g., the Internet or a wide area network (WAN)) to one or more clients. FIG. 1 illustrates, for example, a web client 106 (e.g., a browser) and a programmatic client 108 executing on respective client machines 110 and 112.

An application program interface (API) server 114 and a web server 116 are coupled to, and provide programmatic and web interfaces respectively to, one or more application servers 118. The application server(s) 118 host one or more applications 120. The application server(s) 118 are, in turn, shown to be coupled to one or more database servers 124 that facilitate access to one or more databases 126. While the application(s) 120 are shown in FIG. 1 to form part of the networked system 102, it will be appreciated that, in alternative embodiments, the application(s) 120 may form part of a service that is separate and distinct from the networked system 102.

Further, while the client-server system 100 shown in FIG. 1 employs a client-server architecture, the present disclosure is, of course, not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the application(s) 120 via the programmatic interface provided by the API server 114.

FIG. 1 also illustrates a third-party application 128, executing on a third-party server 130, as having programmatic access to the networked system 102 via the programmatic interface provided by the API server 114. For example, the third-party application 128 may, utilizing information retrieved from the networked system 102, support one or more features or functions on a website hosted by a third party. The third-party website may, for example, provide one or more functions that are supported by the relevant applications 120 of the networked system 102.

In some embodiments, any website referred to herein may comprise online content that may be rendered on a variety of devices including, but not limited to, a desktop personal computer (PC), a laptop, and a mobile device (e.g., a tablet computer, smartphone, etc.). In this respect, any of these devices may be employed by a user to use the features of the present disclosure. In some embodiments, a user can use a mobile app on a mobile device (any of the machines 110, 112 and the third-party server 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
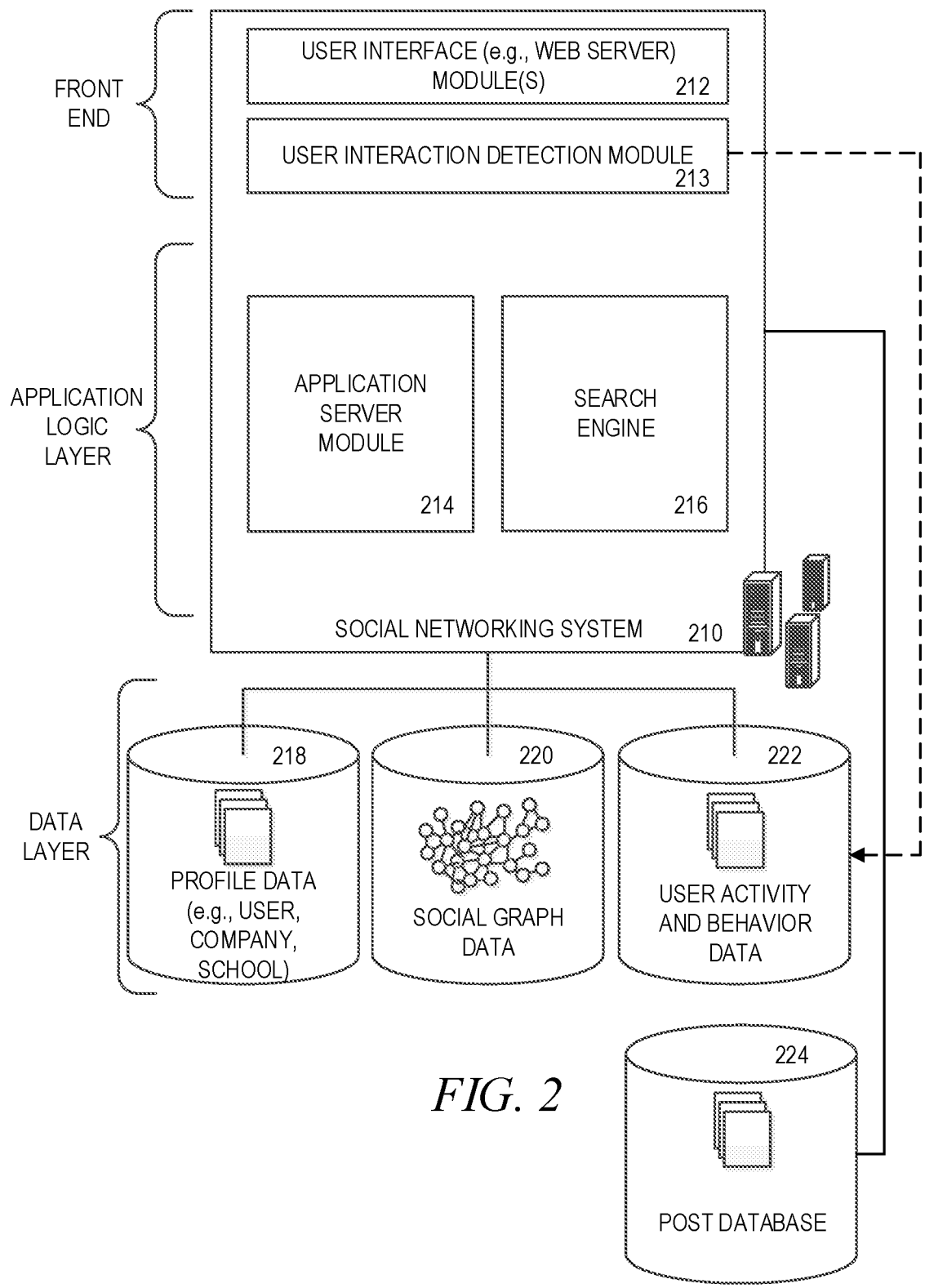
FIG. 2 is a block diagram showing the functional components of a social networking service, including a data processing module referred to herein as a search engine, for use in generating and providing search results for a search query, consistent with some embodiments of the present disclosure.

In some embodiments, the networked system 102 may comprise functional components of a social networking service. FIG. 2 is a block diagram showing the functional components of a social networking service, including a data processing module referred to herein as a search engine 216, for use in generating and providing search results for a search query, consistent with some embodiments of the present disclosure. In some embodiments, the search engine 216 may reside on the application server(s) 118 in FIG. 1. However, it is contemplated that other configurations are also within the scope of the present disclosure.

As shown in FIG. 2, a front end may comprise a user interface module (e.g., a web server 116) 212, which receives requests from various client computing devices and communicates appropriate responses to the requesting client devices. For example, the user interface module(s) 212 may receive requests in the form of Hypertext Transfer Protocol (HTTP) requests or other web-based API requests. In addition, a user interaction detection module 213 may be provided to detect various interactions that users have with different applications 120, services, and content presented. As shown in FIG. 2, upon detecting a particular interaction, the user interaction detection module 213 logs the interaction, including the type of interaction and any metadata relating to the interaction, in a user activity and behavior database 222.

An application logic layer may include one or more various application server modules 214, which, in conjunction with the user interface module(s) 212, generate various user interfaces (e.g., web pages) with data retrieved from various data sources in a data layer. In some embodiments, individual application server modules 214 are used to implement the functionality associated with various applications 120 and/or services provided by the social networking service.

As shown in FIG. 2, the data layer may include several databases 126, such as a profile database 218 for storing profile data, including both user profile data and profile data for various organizations (e.g., companies, schools, etc.). Consistent with some embodiments, when a person initially registers to become a user of the social networking service, the person will be prompted to provide some personal information, such as his or her name, age (e.g., birthdate), gender, interests, contact information, home town, address, spouse's and/or family users' names, educational background (e.g., schools, majors, matriculation and/or graduation dates, etc.), employment history, skills, professional organizations, and so on. This information is stored, for example, in the profile database 218. Similarly, when a representative of an organization initially registers the organization with the social networking service, the representative may be prompted to provide certain information about the organization. This information may be stored, for example, in the profile database 218 or another database (not shown). In some embodiments, the profile data may be processed (e.g., in the background or offline) to generate various derived profile data. For example, if a user has provided information about various job titles that the user has held with the same organization or different organizations, and for how long, this information can be used to infer or derive a user profile attribute indicating the user's overall seniority level, or seniority level within a particular organization. In some embodiments, importing or otherwise accessing data from one or more externally hosted data sources may enrich profile data for both users and organizations. For instance, with organizations in particular, financial data may be imported from one or more external data sources and made part of an organization's profile. This importation of organization data and enrichment of the data will be described in more detail later in this document.

Once registered, a user may invite other users, or be invited by other users, to connect via the social networking service. A "connection" may constitute a bilateral agreement by the users, such that both users acknowledge the establishment of the connection. Similarly, in some embodiments, a user may elect to "follow" another user. In contrast to establishing a connection, the concept of "following" another user typically is a unilateral operation and, at least in some embodiments, does not require acknowledgement or approval by the user that is being followed. When one user follows another, the user who is following may receive status updates (e.g., in an activity or content stream) or other messages published by the user being followed, relating to various activities undertaken by the user being followed. Similarly, when a user follows an organization, the user becomes eligible to receive messages or status updates published on behalf of the organization. For instance, messages or status updates published on behalf of an organization that a user is following will appear in the user's personalized data feed, commonly referred to as an activity stream or content stream. In any case, the various associations and relationships that the users establish with other users, or with other entities and objects, are stored and maintained within a social graph in a social graph database 220.

As users interact with the various applications 120, services, and content made available via the social networking service, the users' interactions and behavior (e.g., content viewed, links or buttons selected, messages responded to, etc.) may be tracked, and information concerning the users' activities and behavior may be logged or stored, for example, as indicated in FIG. 2, by the user activity and behavior database 222. This logged activity information may then be used by the search engine 216 to determine search results for a search query.

In some embodiments, the databases 218, 220, and 222 may be incorporated into the database(s) 126 in FIG. 1. However, other configurations are also within the scope of the present disclosure.

Although not shown, in some embodiments, the social networking system 210 provides an API module via which applications 120 and services can access various data and services provided or maintained by the social networking service. For example, using an API, an application may be able to request and/or receive one or more recommendations. Such applications 120 may be browser-based applications 120 or may be operating system-specific. In particular, some applications 120 may reside and execute (at least partially) on one or more mobile devices (e.g., phone or tablet computing devices) with a mobile operating system. Furthermore, while in many cases the applications 120 or services that leverage the API may be applications 120 and services that are developed and maintained by the entity operating the social networking service, nothing other than data privacy concerns prevents the API from being provided to the public or to certain third parties under special arrangements, thereby making the navigation recommendations available to third-party applications 128 and services.

Although the search engine 216 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when user profiles are indexed, forward search indexes are created and stored. The search engine 216 facilitates the indexing and searching for content within the social networking service, such as the indexing and searching for data or information contained in the data layer, such as profile data (stored, e.g., in the profile database 218), social graph data (stored, e.g., in the social graph database 220), and user activity and behavior data (stored, e.g., in the user activity and behavior database 222). The search engine 216 may collect, parse, and/or store data in an index or other similar structure to facilitate the identification and retrieval of information in response to received queries for information. This may include, but is not limited to, forward search indexes, inverted indexes, N-gram indexes, and so on.

As described above, example embodiments may be utilized for ranking and/or selection of social media posts to display to users. These social media posts may be directly or indirectly generated from user activity within the social networking service and may be stored in post database 224. Examples of social media posts directly generated from user activity include the user themselves posting text, image, or video information as a post. Examples of social media posts indirectly generated from user activity include the social networking service itself generating the post when the user has a change in their profile, when the user is mentioned in an article, and so forth.

Figure 3:
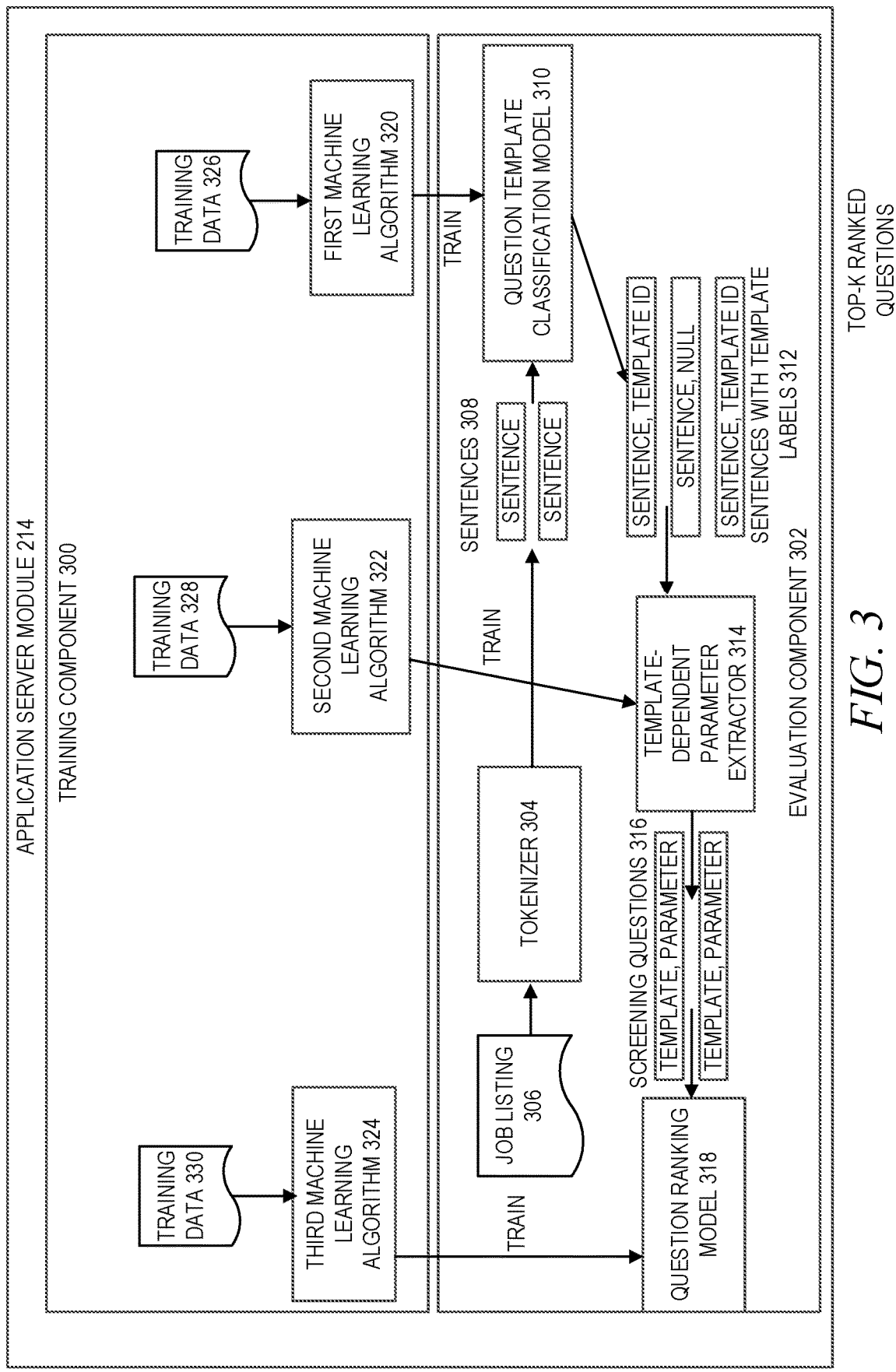
FIG. 3 is a block diagram illustrating an application server module of FIG. 2 in more detail, in accordance with an example embodiment.

FIG. 3 is a block diagram illustrating application server module 214 of FIG. 2 in more detail, in accordance with an example embodiment. While in many embodiments the application server module 214 will contain many subcomponents used to perform various different actions within the social networking system 210, in FIG. 3 only those components that are relevant to the present disclosure are depicted.

Specifically, the application server module 214 can be divided generally into a training component 300 and an evaluation component 302. The training component 300, as will be described, uses various features and machine learning algorithms to train one or more machine learned models. The outputs of the machine learned model(s) are (potentially different) coefficients for each user feature. The evaluation component 302 then uses these coefficients to make runtime decisions as to which pieces of content to display to a user.

Given the text of a job posting $j=\{w_1, \ldots, w_{nw}\}$, where w represents words in the job listing and nw denotes the total number of words in the job, SQG returns k top-ranked structured screening questions $\{(t, p)|t \in T, p \in Pt\}$, where T is a set of predefined templates, and Pt is a set of pre-defined parameters used by template t.

For example, given a job listing of Staff Software Engineer—Data Applications, the SCQ returns a list of screening questions in the format of template and parameter pairs, such as (Have you completed the following level of education, Bachelor's Degree) and (How many years of work experience do you have using, Java)

However, designing a SQG model that can generate screening questions using the whole job listing as input is challenging. In an example embodiment, a four-component sentence level SQG framework is utilized. In the evaluation component 302, a tokenizer 304 is used to divide up input text, in this case text from a job listing 306, into sentences 308. These sentences 308 are then passed to a question template classification model 310, which detects the most probable template for each sentence and then assigns a label indicating the most probable template to each sentence. If there is no probable template for a sentence, it is labeled with "Null." Thus, the result of the question template classification model 310 is a set of sentences with template labels 312. For every sentence that has a valid, non-Null template, a template-dependent parameter extractor 314 is used to extract possible parameters, and then the extracted parameters are used to construct a list of possible screening questions 316 using the extracted parameters and the template. These screening questions 316 are in the form of pairs, with each pair including a template and a parameter. Lastly, all possible questions generated are aggregated and a question ranking model 318 is used to pick the k top-ranked template-parameter pairs as the final suggested screening questions for the given job listing.

Given job posting $j=\{s_1, \ldots, s_{ns}\}$, sentence-level SQG extracts a list of potential screening questions $Qj=\cup_{s_i \in j}\{(t, p)|t=TC(s_i), p \in PE(s_i, t)\}$, where TC is some question template classification model, and PE is some parameter extraction model, and output k top-ranked structured screening questions $\{(t, p)|t \in T, p \in P_t\}=QR(Q_j, j, k)$, where QR is some question ranking model.

In this definition, a one-to-one mapping may be enforced between the sentence and the question template. It is possible, however, for a sentence to map to more than one parameter, but use the same template. This is especially useful for compound requirements, such as a sentence like "4+ years experience programming in Java and C++," which can be converted into two screening questions with the same template (How many years of work experience do you have using, Java) and (How many years of work experience do you have using, C++).

Given a sentence $s=\{w_1, \ldots, w_{n_w}\}$ from job posting j where w are word tokens, Question Template Classification (TC) predicts the question template $t_s \in T$ of s or NULL if s does not match any template.

Given a sentence $s=\{w, \ldots, w_{n_{sj}}\}$ from job posting j and predicted template $t_s$, Template Parameter Extraction (PE) extracts a list of possible parameter values $P_{s,t_s}$ from s with respect to template $t_s$.

Note that for a given sentence s, question template classification may return NULL if s should not be converted into any screening question. Note that SQG is different from the traditional QG settings where the input text always maps to one or more questions [10, 40]. In SQG, a large portion of the sentences in the job posting is irrelevant to the qualification evaluation of an applicant, and therefore should not be converted into screening questions.

After getting the screening question candidate set $Q_j$, we use a question ranking model to rank all the questions and return the top-k as the generated screening questions of job posting j.

Given a list of screening question candidates $Q_j$, Question Ranking (QR) ranks them into an ordered list based on Pr(accepted|(j, t, p)), the probability that job posters will add screening question (t, p) to job j by, for example, adding the question as an adjunct to the job listing so that it will be asked to applicants of the job.

In the following sections, we will describe the data collection strategy and the model design of our proposed sentence-level SQG model, Job2Questions.

Referring now to the training component 300, there are three machine learning algorithms 320, 322, 324, one each to train the question template classification model 310, template-dependent parameter extractor 314, and the question ranking model 318. Each of the machine learning algorithms 320, 322, 324 utilizes different training data.

In an example embodiment, the first machine learning algorithm 320 uses training data 326. Training data 326 are labeled sentence-template pairs, namely examples of sample sentences with corresponding templates. In an example embodiment, the labels may be collected via crowdsourcing. Specifically, a series of questions may be asked to crowd-sourcing individuals to get them to provide the labels, such as:

Is the given sentence from job description directly relating to the given screening question?
Sentence from Job Description:
Post graduate or PhD in Computer Science or Machine Learning related degree with a focus on NLP;
Screening Question:
Have you completed the following level of education: Ph.D.?
Is the given sentence from job description directly related to the given screening question?
Sentence from Job Description:
Performing annual and periodic Fair Lending and UDAAP analysis and reporting utilizing CRA Wiz and R Studio.
Screening Question:
How many years of work experience do you have using R?

The sentences and screening questions to present to the crowdsourcing individuals may be generated by first recognizing entities from all sentences, entities being names or identifications provided in a taxonomy and may include, for example, companies, skills, educational institutions, and so forth. A list of all sentences that contain valid parameter entities are then compiled. For each sentence-parameter (s, pair, we generate a screening question (t,p) for s, where p can be used as t's parameter (p∈$P_t$); lastly, we randomly sample a subset of these generated (s, t, p) triples, convert them into the format shown in Tab. 4, and ask human annotators to label these sentence-question pairs. We consider the sentence-template pair (s, t) pair as positive if the human labeler labels at least one triple from $\{(s, (t, p))|p \in P_t\}$ as directly related. Otherwise we consider that sentence s maps to NULL template (s, NULL).

Figure 4:
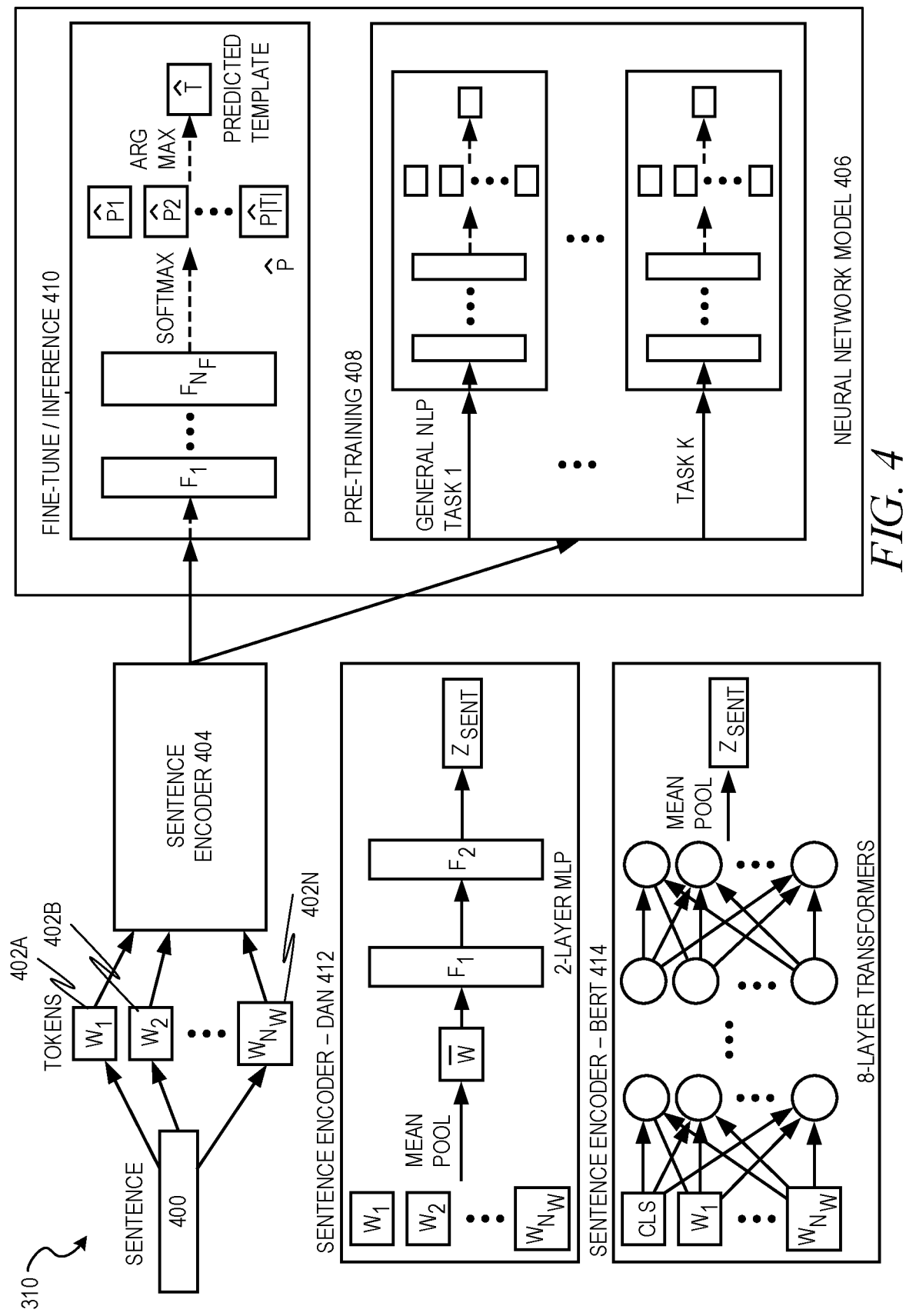
FIG. 4 is a diagram illustrating a question template classification model, in accordance with an example embodiment.

Question template classification takes a raw sentence as input and predicts its most probable template label, or Null if it is not eligible. In an example embodiment, this process may be treated as a multiclass classification task and the template labels and non-eligible Null as classes. FIG. 4 is a diagram illustrating a question template classification model 310, in accordance with an example embodiment. As seen, an input sentence 400 is tokenized into n-gram tokens 402A-402N and a sentence encoder 404 converts the tokens 402A-402N into a sentence embedding vector $z_{sent}$. The generated sentence embedding vector is then sent to a neural network model 406 to predict its most probable class label.

Because the training data 326 is relatively small compared to the millions of jobs posted on a social networking site, it does not contain all the words in the possible vocabulary and does not cover all of the creative ways recruiters describe job requirements. To address this issue, multi-task transfer learning is used to pretrain the sentence encoding model with multiple natural language understanding tasks, and transfer learning is used to fine-tune the trained model with a question template classification task. As shown in FIG. 4, the sentence encoder is first pre-trained 408 with general tasks, and then the sentence encoder 404 is fine-tuned 410 with the task-specific multilayer perceptron network (MLP) using the template classification data.

In an example embodiment, one of two methods may be used to encode sentences into embeddings. One is called Deep Average Network (DAN) 412 and the other is called Bidirectional Transformers (BERT) 414.

The DAN model first averages the embedding of the input tokens into $\bar{w}$, and then passes it through two fully-connected layers to get the sentence representation $z_{sent}$.

$$\bar{w} = \frac{1}{n_w}\sum_{i}^{k} w_i;$$

$$h_1 = relu(\bar{w}W_1 + b_1);$$

$$z_{sent} = relu(h_1 W_2 + b_2).$$

BERT, on the other hand, uses Transformer layer 38 to encode the input sentence to embedding. It is defined as follows $$TFLayer(h^{n-1}) = FC(MultiAttn(h^{n-1}));$$

$$FC(x) = relu(xW_1 + b_1)W_2 + b_2;$$

$$MultiAttn(h^{n-1}) = concat(head_1(h^{n-1}), \ldots, head_k(h^{n-1}))W^O,$$

$$head_i(h^{n-1}) = softmax\left(\frac{(h^{n-1}W_q^i)(h^{n-1}W_k^i)}{\sqrt{d_k}}\right)(h^{n-1}W_v^i).$$

where $h^{n-1}$ is the output of the previous Transformer layer. Here, a BERT model with 8 Transformer layers is used, and the output sentence embedding $z_{sent}$ is defined as the mean-pooling result of the last transformer layer's output. For simplicity, batch normalization and residual connections are omitted in the equations.

After the sentence embedding $z_{sent}$ is obtained, it is passed through a MLP wherein each fully-connected layer is defined as $$f(x)=\text{relu}(xW+b),$$

and the last layer of the MLP is defined as $$\hat{P}=\text{softmax}(f(x)W+b),$$

where the output $\hat{P}$ is the categorical probability distribution of each class. Finally, the most probable class $\arg\max(\hat{P})$ is picked as the final predicted template label. To train the model, a binary-cross entropy loss can be used:

$$\mathcal{L}(P,\hat{P}) = -\sum_i p^i \log \hat{p}^i,$$

where P is the ground truth, $p^i$ and $\hat{p}^i$ are the ground truth and predicted probability of $i^{th}$ template respectively. An Adam optimizer (adaptive learning rate optimization algorithm) may be used to optimize the model parameters.

Returning to FIG. 3, in an example embodiment, the second machine learning algorithm 322 uses training data 328. Training data 328 may include tagged entity mentions from sentences. Specifically, an entity taxonomy (not pictured) that contains large sets of entities is used to identify possible entity mentions from the given text. This taxonomy may be created by humans or may be partially or completely machine learned. The taxonomy may be hierarchical and may indicate hierarchical relationships between terms, such as computer programmer being a subset of technology job titles. For embodiments not related to job listings, the entities may be, for example, concepts, locations, names, etc. In an example embodiment, four types of entities are supported: educational degrees, tool-typed skills, spoken languages, and credentials (e.g., certifications and licenses). In other example embodiments, however, other types of entities may be used.

After entity mentions are identified from job listing sentences through a comparison of the job listing sentences to the entities in the taxonomy to identify matches, a feature-based regression model may be used to link the mention to an entity in the taxonomy. Besides global features such as mention frequency, contextual features from a part of speech (POS) tag, context n-grams, and cosine similarity between embeddings of the mention and its context may be used. These contextual features help the model identify invalid mentions such as Bachelor's degree in "We provide bachelor party supplies" or the Chinese language in "our clients include European and Chinese companies." Entity mentions with a confidence score that passes a threshold will be considered as template parameters of the given sentence s and template $t_s$.

In an example embodiment, the third machine learning algorithm 324 uses training data 330. The objective of question ranking is to predict the probability of a screening question (t, p) being added to, or otherwise selected as being relevant to, a job listing j by the job poster. To train such a ranking model, corresponding (j, t, p) triples are collected for model training.

Although one could ask job posters to manually add screening questions to jobs, and use these manually added questions as training data, such an approach would only provide positively labelled triples. Thus, one needs negatively labelled triples as well. One solution would be to randomly generate negative data that do not match the manually added questions, but these negatively labelled triples may have a high false-negative rate: job posters may simply not have added such questions manually because they forgot to, not because they were not relevant questions.

Therefore, in an example embodiment, explicitly provided negative labelled data is sought. Specifically, a simplified sentence-level SQG model is designed and deployed to provide screening question suggestions to job posters (or other sets of users, depending on implementation) and then collect the labelled question ranking triples using job poster feedback. This simplified sentence level SQG model may be a non-neural network baseline which tokenizes the input sentence into a bag of word vectors and then trains an XGBoost model to predict the template label. Namely, if a job poster accepts a suggestion or adds a new screening question, a positive labelled triple is generated. If a job poster rejects a screening question suggestion, a negative labelled triple is generated.

The training data 328 is used as ground truth labels and a question ranking objective is defined as predicting the likelihood of a job poster adding or associating a possible screening question to a job listing j:

$$Pr(\text{accepted}|j,t,p)=\text{sigmoid}(f(x_{j,t,p})), \qquad (4)$$

where $f$ is the scoring function, $x_{j,t,p}$ is the feature vector with respect to the given job j, template label t, and parameter p.

The features used to construct $x_{j,t,p}$ can be grouped into three groups: job-side features, question-side features, and job-question interactive features. Job-side features: Job attributes such as job's title, industry, company, location, and others.

Question-side features: Screening question attributes such as question template type, parameter value, template classification score, and entity linking system's confidence score. Job-Question interactive features: We generate interactive features by computing the Pointwise Mutual Information (PMI) between job- and question-side features. The PMI is defined as follows:

$$PMI(F_j; F_q) = \log \frac{Pr(F_j, F_q)}{Pr(F_j)Pr(F_q)},$$

where $F_j$ and $F_q$ are the job- and question-side categorical features respectively. Here the PMI value may be used to quantify the discrepancy between the probability of correspondence of a job-side and a question-side event given both joint and individual distribution.

After describing the feature vector $x_{j,t,p}$, the scoring function $f$ may be presented. XGBoost may be used as a scoring junction:

$$Pr(\text{accepted}|j,t,p) = \text{sigmoid}\left(\sum_k f_k(x_{j,t,p})\right)$$

where $f_k$ is the $k^{th}$ tree of the model. The following loss function may then be used to optimize the question ranking model $$\mathcal{L} = -\sum_{(j,t,p)\in D^+} \log\left(\sum_k f_k(x_{j,t,p})\right) - \sum_{(j,t,p)\in D^-} \log\left(1 - \sum_k f_k(x_{j,t,p})\right) + \sum_k \Omega(f_k),$$

where $D^+$ and $D^-$ are the positive and negative (j, t, p) triple sets collected using the job posters' feedback described earlier. $f_k$ represents the $k^{th}$ tree in the boosted-tree model, $\Omega(f_k) = \gamma T + 1/1\lambda\|w\|^2$ is the regularization term that penalizes the complexity of tree $f_k$, in which T denotes the number of leaves in tree $f_k$, w is the leaf weights. $\gamma$ and $\lambda$ are the regularization parameters.

Figure 5:
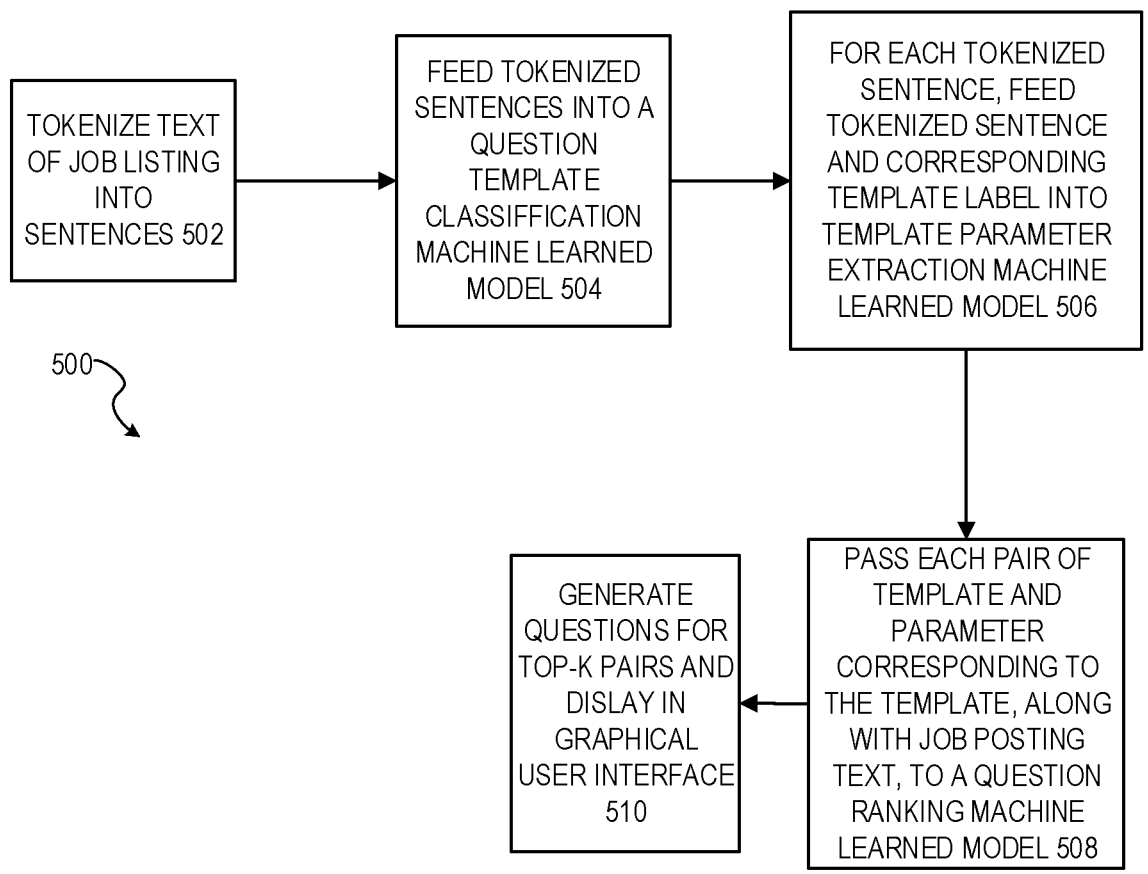
FIG. 5 is a flow diagram illustrating a method for automatically generating one or more screening questions for a job listing, in accordance with an example embodiment.

FIG. 5 is a flow diagram illustrating a method 500 for automatically generating one or more screening questions for a job listing, in accordance with an example embodiment. At operation 502, text of the job listing is tokenized into sentences. At operation 504, the tokenized sentences are fed into a question template classification machine learned model, producing a template label or a null label for each of the tokenized sentences, with each template label uniquely identifying a template containing a general portion of a different screening question. A null label indicates the question template classification machine learned model has failed to find a matching template for the corresponding tokenized sentence. As described above, the question template classification machine learned model is trained using sample questions with sample template labels.

At operation 506, for each of the tokenized sentences, the sentence and the corresponding template label are fed into a template parameter extraction machine learned model to produce a set of one or more parameters in the tokenized sentence related to the corresponding template. As described above, the template parameter extraction machine learned model may be trained using a predefined taxonomy listing entity names within an online network, as well as labels indicating which entity names are present in which sample tokenized sentence/template combinations.

At operation 508, each pair of template and parameter corresponding to the template, and the job posting text, may be passed to a question ranking machine learned model. The question ranking machine learned model is trained to rank each pair against each other with respect to the likelihood that a recruiter or other person who posted the job listing will add a question represented by the pair as a screening question in the job listing. At operation 510, questions for the top-k pairs are generated and displayed in a graphical user interface for potential selection as additions to the job listing. Once a question from those displayed is selected, it may be added to the job posting.

Figure 6:
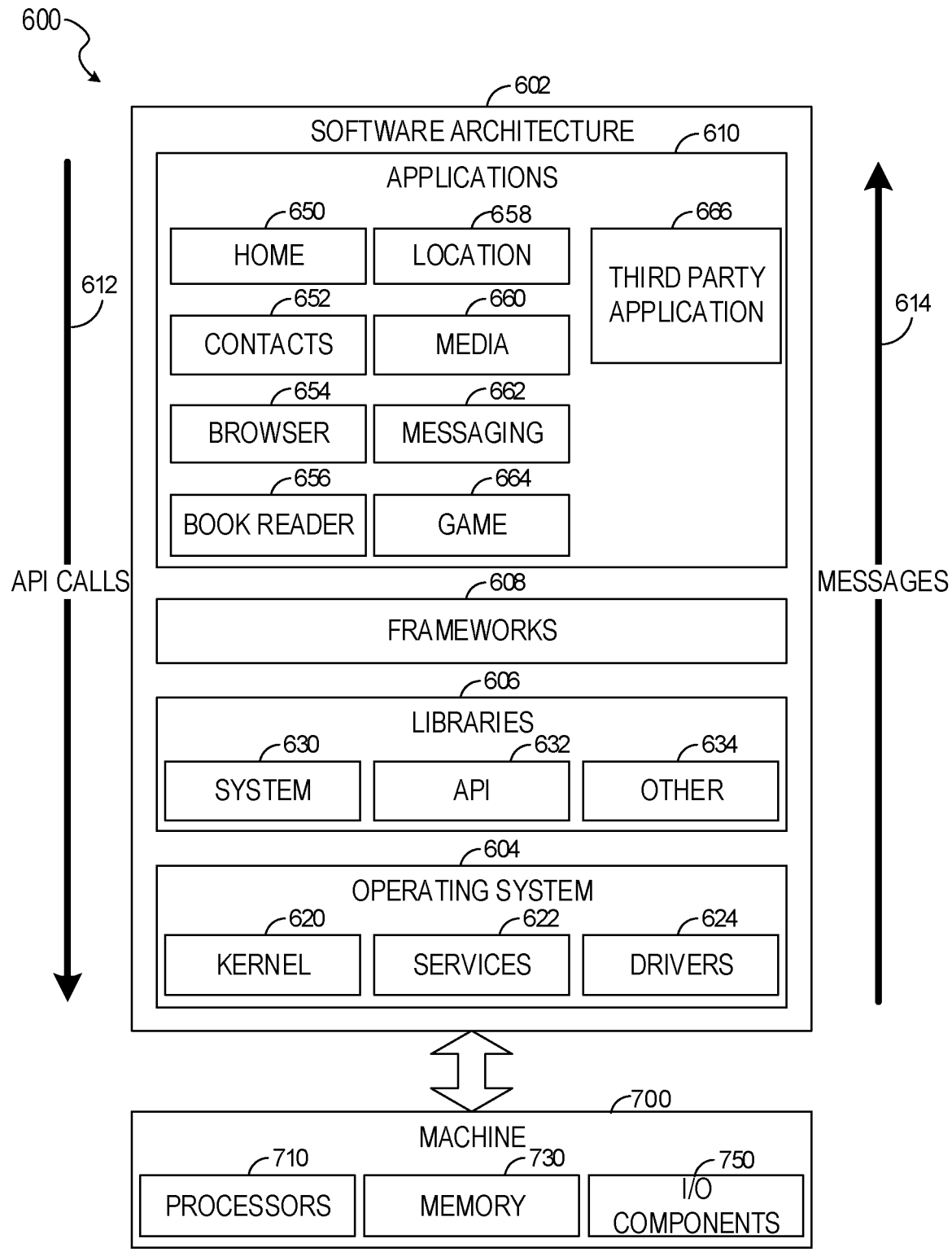
FIG. 6 is a block diagram illustrating a software architecture, in accordance with an example embodiment.

FIG. 6 is a block diagram 600 illustrating a software architecture 602, which can be installed on any one or more of the devices described above. FIG. 6 is merely a non-limiting example of a software architecture, and it will be appreciated that many other architectures can be implemented to facilitate the functionality described herein. In various embodiments, the software architecture 602 is implemented by hardware such as a machine 700 of FIG. 7 that includes processors 710, memory 730, and input/output (I/O) components 750. In this example architecture, the software architecture 602 can be conceptualized as a stack of layers where each layer may provide a particular functionality. For example, the software architecture 602 includes layers such as an operating system 604, libraries 606, frameworks 608, and applications 610. Operationally, the applications 610 invoke API calls 612 through the software stack and receive messages 614 in response to the API calls 612, consistent with some embodiments.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware, according to some embodiments. For instance, the drivers 624 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610, according to some embodiments. For example, the frameworks 608 provide various graphical user interface functions, high-level resource management, high-level location services, and so forth. The frameworks 608 can provide a broad spectrum of other APIs that can be utilized by the applications 610, some of which may be specific to a particular operating system 604 or platform.

In an example embodiment, the applications 610 include a home application 650, a contacts application 652, a browser application 654, a book reader application 656, a location application 658, a media application 660, a messaging application 662, a game application 664, and a broad assortment of other applications, such as a third-party application 666. According to some embodiments, the applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third-party application 666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 666 can invoke the API calls 612 provided by the operating system 604 to facilitate functionality described herein.

Figure 7:
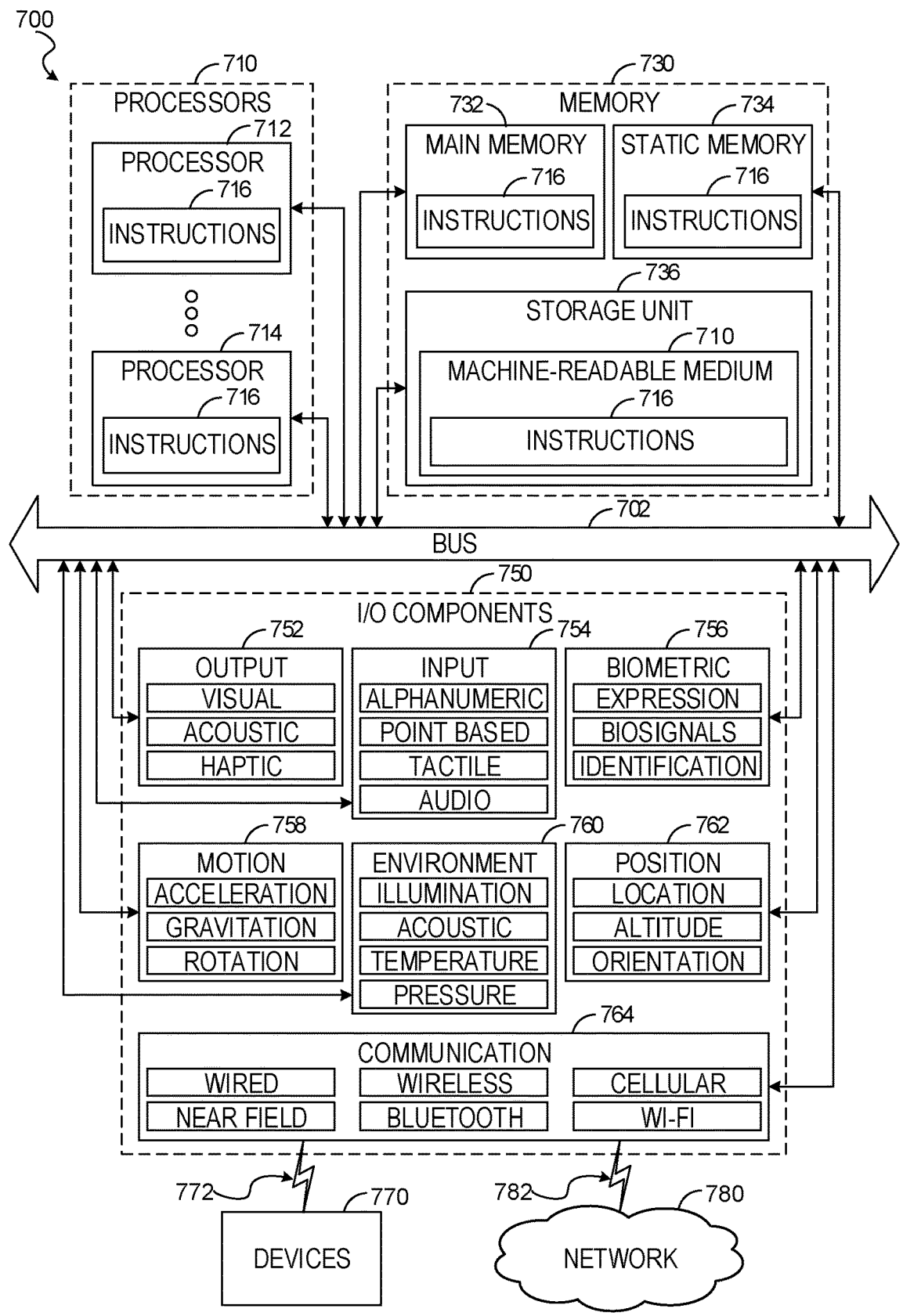
FIG. 7 illustrates a diagrammatic representation of a machine in the form of a computer system within which a set of instructions may be executed for causing the machine to perform any one or more of the methodologies discussed herein, according to an example embodiment.

FIG. 7 illustrates a diagrammatic representation of a machine 700 in the form of a computer system within which a set of instructions may be executed for causing the machine 700 to perform any one or more of the methodologies discussed herein, according to an example embodiment. Specifically, FIG. 7 shows a diagrammatic representation of the machine 700 in the example form of a computer system, within which instructions 716 (e.g., software, a program, an application 610, an applet, an app, or other executable code) for causing the machine 700 to perform any one or more of the methodologies discussed herein may be executed. For example, the instructions 716 may cause the machine 700 to execute the method 500 of FIG. 5. Additionally, or alternatively, the instructions 716 may implement FIGS. 1-5, and so forth. The instructions 716 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a PC, a tablet computer, a laptop computer, a netbook, a set-top box (STB), a portable digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and I/O components 750, which may be configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors 710 that may comprise two or more independent processors 712 (sometimes referred to as "cores") that may execute instructions 716 contemporaneously. Although FIG. 7 shows multiple processors 710, the machine 700 may include a single processor 712 with a single core, a single processor 712 with multiple cores (e.g., a multi-core processor), multiple processors 710 with a single core, multiple processors 710 with multiple cores, or any combination thereof.

The memory 730 may include a main memory 732, a static memory 734, and a storage unit 736, all accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 may include a wide variety of components to receive input, provide output, produce output, transmit information, exchange information, capture measurements, and so on. The specific I/O components 750 that are included in a particular machine 700 will depend on the type of machine 700. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion, and the grouping is in no way limiting. In various example embodiments, the I/O components 750 may include output components 752 and input components 754. The output components 752 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762, among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 762 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., a peripheral device coupled via a USB).

Moreover, the communication components 764 may detect identifiers or include components operable to detect identifiers. For example, the communication components 764 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 730, 732, 734, and/or memory of the processor(s) 710) and/or the storage unit 736 may store one or more sets of instructions 716 and data structures (e.g., software) embodying or utilized by any one or more of the methodologies or functions described herein. These instructions (e.g., the instructions 716), when executed by the processor(s) 710, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 716 and/or data. The terms shall accordingly be taken to include, but not be limited to, solid-state memories, and optical and magnetic media, including memory internal or external to the processors 710. Specific examples of machine-storage media, computer-storage media, and/or device-storage media include non-volatile memory including, by way of example, semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 780 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

The instructions 716 may be transmitted or received over the network 780 using a transmission medium via a network interface device (e.g., a network interface component included in the communication components 764) and utilizing any one of a number of well-known transfer protocols (e.g., HTTP). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A computerized method for automatically generating one or more questions pertaining to a document, comprising: tokenizing the document into a plurality of tokenized sentences; feeding the plurality of tokenized sentences into a question template classification machine learned model, producing a template label for each of the tokenized sentences, the template label indicating a matching template for the corresponding tokenized sentence, the question template classification machine learned model having a sentence encoder portion and a classification portion, the sentence encoder portion trained using a two-step training process comprising: pretraining the sentence encoder portion using multi-task transfer learning; and retraining the sentence encoding portion using a question template classification task and template classification data output by the classification portion; feeding the plurality of tokenized sentences and the template labels into a template parameter extraction machine learned model to extract one or more parameters from at least one of the tokenized sentences; generating a plurality of questions, each question generated using a combination of a template and the corresponding extracted parameter; and rendering, in a graphical user interface, at least one of the generated plurality of questions.

2. The method of claim 1, further comprising:
feeding a plurality of template and corresponding extracted parameter pairs into a question ranking machine learned model, the question ranking machine learned model trained to output a ranking of the plurality of the extracted parameter pairs; and
wherein the generating includes generating a question for only top-k ranked pairs in the plurality of the extracted parameter pairs.

3. The method of claim 2, wherein the question ranking model is trained by feeding sample job listings and sample questions generated from the sample job listings to a third machine learning algorithm, each combination of job listing and sample question generated from the sample job listing having a label indicating whether a corresponding user added the corresponding sample question to the sample job listing.

4. The method of claim 3, wherein the third machine learning algorithm extracts job features from the sample job listings, question features from the sample questions, and computed job-question interactive features and learns weights assigned to the various features.

5. The method of claim 4, wherein the job-question interactive features are computed by computing a pointwise mutual information (PMI) metric between corresponding job and question features.

6. The method of claim 3, wherein the job features include title, industry, company, and location.

7. The method of claim 3, wherein the question features include template type and parameter value.

8. The method of claim 1 wherein the question template classification machine learned model is trained by passing sample tokenized sentences labeled with template identifications into a first machine learning algorithm.

9. The method of claim 8, wherein the first machine learning algorithm is a two part learning algorithm, utilizing multi-task transfer learning to pretrain a sentence encoding model with multiple natural language understanding tasks and then utilizing transfer learning to fine tune the trained model with a question template classification task.

10. The method of claim 9, wherein the sentence encoding model is a deep bidirectional transformers (BERT) model.

11. The method of claim 9, wherein the sentence encoding model is a deep average network (DAN) model.

12. The method of claim 8, wherein the sample tokenized sentences labeled with template identifications are obtained using a crowd sourcing task where human annotators are asked whether a sample sentence is related to a question formed from a template and a parameter extracted from the sample sentence.

13. The method of claim 1, wherein the template parameter extraction machine learned model is trained by passing a taxonomy of entity names and sample sentences to a second machine learning algorithm.

14. The method of claim 13, wherein the second machine learning algorithm extracts mentions of entity names from the sample sentences using the taxonomy and applies a feature-based regression model to assign weights to context-based features about the mentions to output a score, for each input sentence, indicating a confidence level that the entity represents a parameter for the sentence.

15. The method of claim 14, wherein parameters whose confidence level exceed a predetermined threshold are considered parameters for a template generated from the input sentence.

16. A system comprising: a computer-readable medium having instructions stored thereon, which, when executed by a processor, cause the system to perform operations for automatically generating one or more questions pertaining to a document, comprising: tokenizing the document into a plurality of tokenized sentences; feeding the plurality of tokenized sentences into a question template classification machine learned model, producing a template label for each of the tokenized sentences, the template label indicating a matching template for the corresponding tokenized sentence, the question template classification machine learned model having a sentence encoder portion and a classification portion, the sentence encoder portion trained using a two-step training process comprising: pretraining the sentence encoder portion using multi-task transfer learning: and retraining the sentence encoding portion using a question template classification task and template classification data output by the classification portion; feeding the plurality of tokenized sentences and the template labels into a template parameter extraction machine learned model to extract one or more parameters from at least one of the tokenized sentences; generating a plurality of questions, each question generated using a combination of a template and the corresponding extracted parameter; and rendering, in a graphical user interface, at least one of the generated plurality of questions.

17. The system of claim 16, wherein the operations further comprise:
feeding a plurality of template and corresponding extracted parameter pairs into a question ranking machine learned model, the question ranking machine learned model trained to output a ranking of the plurality of the extracted parameter pairs; and
wherein the generating includes generating a question for only top-k ranked pairs in the plurality of the extracted parameter pairs.

18. The system of claim 16, wherein the question template classification machine learned model is trained by passing sample tokenized sentences labeled with template identifications into a first machine learning algorithm.

19. The system of claim 18, wherein the first machine learning algorithm is a two part learning algorithm, utilizing multi-task transfer learning to pretrain a sentence encoding model with multiple natural language understanding tasks and then utilizing transfer learning to fine tune the trained model with a question template classification task.

20. A non-transitory machine-readable storage medium comprising instructions which, when implemented by one or more machines, cause the one or more machines to perform operations for automatically generating one or more questions pertaining to a document, comprising: tokenizing the document into a plurality of tokenized sentences; feeding the plurality of tokenized sentences into a question template classification machine learned model, producing a template label for each of the tokenized sentences, the template label indicating a matching template for the corresponding tokenized sentence, the question template classification machine learned model having a sentence encoder portion and a classification portion, the sentence encoder portion trained using a two-step training process comprising: pretraining the sentence encoder portion using multi-task transfer learning; and retraining the sentence encoding portion using a question template classification task and template classification data output by the classification portion; feeding the plurality of tokenized sentences and the template labels into a template parameter extraction machine learned model to extract one or more parameters from at least one of the tokenized sentences; generating a plurality of questions, each question generated using a combination of a template and the corresponding extracted parameter; and rendering, in a graphical user interface, at least one of the generated plurality of questions.

* * * * *